United States Patent [19]

Faurenhoff

[11] Patent Number: 4,961,589
[45] Date of Patent: Oct. 9, 1990

[54] TRAILER TONGUE ALIGNMENT

[75] Inventor: Erv Faurenhoff, Los Angeles, Calif.

[73] Assignee: Norco Industries, Inc., Compton, Calif.

[21] Appl. No.: 321,003

[22] Filed: Mar. 9, 1989

[51] Int. Cl.⁵ ............................................. B60D 1/00
[52] U.S. Cl. .................................. 280/475; 248/352; 280/477
[58] Field of Search ...................... 280/477, 475, 416.1, 280/416.3, 465, 470, 478.1, 763.1, 766.1; 410/58, 57, 61, 8, 52, 56, 62, 75, 80; 248/352, 351

[56] References Cited

U.S. PATENT DOCUMENTS

| 831,956 | 9/1906 | Jonas | 280/46.1 |
|---|---|---|---|
| 839,518 | 12/1906 | Shaw | 280/465 |
| 1,235,082 | 7/1917 | Von Brethorst | 280/470 |
| 1,391,760 | 9/1921 | Collier | 280/404 |
| 1,424,631 | 8/1922 | Edmonds | 280/470 |
| 1,450,526 | 4/1923 | Timmis | 280/470 |
| 1,665,133 | 4/1928 | Gibson | 280/470 |
| 2,089,400 | 8/1937 | Morris | 280/502 |
| 2,917,323 | 12/1959 | Mandekic | 280/470 |
| 3,178,203 | 4/1965 | Elliott | 280/470 |
| 3,740,077 | 6/1973 | Williams | 280/475 |
| 3,807,767 | 4/1974 | Moline | 280/3 X |
| 3,837,674 | 9/1974 | Rathsack | 280/416.3 |
| 3,891,239 | 6/1975 | Leo et al. | 280/479.1 |
| 4,131,256 | 12/1978 | F'Geppert | 410/80 X |
| 4,214,772 | 7/1980 | Carr et al. | 280/416.1 |
| 4,437,680 | 5/1984 | Della-Moretta | 280/446.1 |

Primary Examiner—Mitchell J. Hill
Attorney, Agent, or Firm—Fulwider, patton, Lee & Utecht

[57] ABSTRACT

A trailer tongue twister apparatus having an elongated channel-like bedplate including a threaded drive screw disposed longitudinally in the bedplate and supported therefrom at the opposite ends of the screw by a pair of journal supports, the method of construction including a hex head nut at one end of the drive screw for rotating the screw through a threaded hole formed within a cylindrically shaped block trunnion affixed to a load-bearing sled that travels along a pair of flanges when the drive screw is rotated, the sled carrying a cylindrical receiver ring fashioned for receiving a support leg of a travel trailer tongue jack, while rotation of the drive screw applied an alignment force to the tongue jack resulting in fine adjustments to the trailer coupler, which simplifies the alignment process and improves the coupler efficiency by permitting alignment between the trailer coupler and a staionary tow vehicle ball hitch in either a horizontal or angular pattern.

9 Claims, 1 Drawing Sheet

TRAILER TONGUE ALIGNMENT

BACKGROUND OF THE INVENTION

This invention relates to trailer coupler alignment devices, and more particularly, to a stationary trailer coupler alignment device of the type employing a load-bearing rotary screw-driven platform for positioning a trailer coupler directly over a tow vehicle ball hitch.

In the field of recreational vehicles, non-motorized travel trailers are generally towed by a separate vehicle. To accommodate the tow vehicle, the travel trailer is generally equipped with a tongue jack located at the tongue or coupler end of the trailer. The tongue jack is employed to raise and lower a coupler device which is located at the forward end of the trailer. Thus, the tongue jack permits the coupler device to be positioned onto and off of a ball hitch device mounted on the rear end of the tow vehicle.

In the past, this task has been accomplished by aligning the ball hitch device of the tow vehicle directly under the coupler device of the travel trailer. This has been generally accomplished by continuously changing the position of the tow vehicle in a trial and error fashion by numerous backing maneuvers until the ball hitch device was located directly beneath the coupler device. The tow vehicle was positioned so that the ball hitch device was sufficiently close to the trailer coupler device so that when the travel trailer was lowered by releasing the tongue jack, the coupler device captured the ball hitch. The main problem is that the coupler device must be closely aligned with the ball hitch device in order to successfully connect the travel trailer to the tow vehicle.

Several methods have been employed in the past in an attempt to solve this alignment problem. One such method included a trailer hitch system having longitudinal hitch ball movement wherein a trailer tow point could be laterally adjusted. The longitudinal hitch ball movement was facilitated by a screw shaft housed in the trailer hitch system and was readily accessible from either side of the trailer hitch. The hitch system was design to accommodate multiple hitch balls and permitted any one of such hitch balls to be selectively centered on a bumper of a towing vehicle. It was possible to interchange hitch balls of diverse sizes while the trailer hitch system was installed on the towing vehicle. Further, the hitch system was adaptable to any type of towing vehicle and an adaptor was available which permitted attachment of other types of hitches which were also laterally adjustable therewith. The screw shaft was mounted within a screw block positioned through a circular threaded portion. The hitch balls were mounted in a ball retaining plate and when the screw was rotated, the screw block traveled along the screw shaft and laterally displaced the hitch balls.

Another attempt to solve the problem included a trailer hitch having a laterally adjustable coupling member. The travel hitch with the adjustable coupling member also included a follower which comprised a sleeve threaded on a screw. A globular coupling element such as a hitch ball was secured to the upper portion of the follower. A crank was provided and when rotated, the follower traveled along the screw and laterally displaced the hitching element for providing the laterally adjustable coupling member.

Yet another method for attempting to solve the alignment problem included a drawbar coupling for use in motorized vehicles such as tractors. A block was provided for being laterally moved along a guide. As a worm screw member was turned by means of a bevel screw, the block was in turn laterally displaced along the guide.

A more current method employed a tractor truck having a pivoting frame extending from the rear and having a hitching ball mounted thereon and laterally shiftable by a hydraulic actuator. The frame was movable up or down along a horizontal axis by a hydraulic actuator for moving the hitching ball up or down. Locking pins were provided for unloading the actuator cylinders during over the road operation.

Finally, a different approach has been known by incorporating a hand cranked, non-traveling screw for repositioning the tongue extending from the towed vehicle to extreme angles. Many other methods and devices have been known, each of which employ a threaded screw member and a ball hitch and each with a means for adjusting the lateral position of the ball hitch. Most of these systems employ apparatus which are connected directly to the tow vehicle for adjusting the position of the ball hitch.

Hence, those concerned with the development and use of &owing systems in the non-motorized recreational vehicle field have long recognized the need for an improved alignment system which eliminates the trial and error aligning process between the non-motorized travel trailer and the tow vehicle, which includes an apparatus for receiving the tongue jack of the travel trailer and which may be employed for aligning in a horizontal or angular pattern the trailer coupler to an otherwise stationary vehicle ball hitch, the construction of such a system being rugged but simple and being operated by a common ratchet or wrench and which widely distributes the mechanical load of the travel trailer over the apparatus to avoid binding. The present invention fulfills all of these needs.

SUMMARY OF THE INVENTION

Briefly, and in general terms, the present invention provides a new and improved travel trailer alignment apparatus construction which substantially simplifies the alignment process between a travel trailer coupler and a tow vehicle ball hitch, and which significantly improves the efficiency of coupling by permitting alignment of the trailer coupler to the otherwise stationary vehicle ball hitch in a horizontal or angular pattern. Moreover, the alignment apparatus construction of the present invention supports the tongue jack of the travel trailer during alignment by widely distributing the mechanical load over the apparatus to avoid binding, the apparatus having a rugged but simple construction, may be operated by a common ratchet or wrench, provides for water drainage, and is treated to inhibit rust and corrosion.

Basically, the present invention is directed to an improved trailer tongue twister apparatus and method of construction for simplifying the alignment process between the travel trailer coupler and the tow vehicle ball hitch. This is accomplished by providing the trailer tongue twister apparatus with a load-bearing surface for supporting the trailer tongue jack and a design capable of aligning the trailer coupler in a horizontal or angular pattern.

In accordance with the invention, rotational motion of a drive screw is converted into translational motion of a moving platform or sled which applies an alignment force to the travel trailer coupler via the tongue jack.

In accordance with the improved method of the present invention, as a force is applied to a drive screw hex nut, the drive screw is forced to rotate causing a combined block trunnion and load-bearing sled to travel along the length of the drive screw. The trailer tongue jack is supported by and moves with the load-bearing sled forcing the trailer tongue and coupler to be shifted in position for aligning with the tow vehicle ball hitch.

The new and improved trailer tongue alignments apparatus and method of construction of the present invention simplifies the alignment process between the travel trailer coupler and the tow vehicle ball hitch and improves the efficiency of coupling by permitting alignment of the trailer coupler to an otherwise stationary vehicle ball hitch in a horizontal or angular pattern. Also, the alignment apparatus construction supports the tongue jack of the travel trailer during alignment by widely distributing the mechanical load over the apparatus to avoid binding, the construction of the apparatus being rugged but simple and is operated by a common ratchet or wrench, provides for water drainage when used in inclement weather, and is treated to inhibit rust and corrosion.

These and other features and advantages of the invention will become apparent from the following more detailed description, when taken in conjunction with the accompanying drawings, which illustrate, by way of example, the features of the invention.

DETAILED DESCRIPTION OF THE PREFERRED EMBODIMENT

Figure 1:
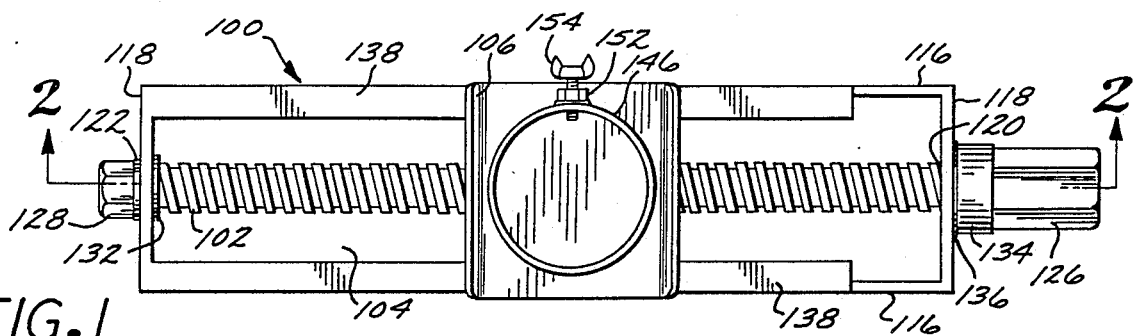
FIG. 1 is a planar view of a trailer tongue alignment apparatus in accordance with the present invention.

As shown in the drawings for purposes of illustration, the invention is embodied in a trailer tongue alignment apparatus 100 of the type having a threaded drive screw 102 mounted in an elongated box-like frame having a bedplate 104 and a load-bearing sled 106 which supports and carries a trailer tongue jack 108 for aligning a trailer coupler 110 connected to the tongue jack with a tow vehicle ball hitch when the drive screw 102 is operated.

Non-motorized travel trailers are generally towed by a separate vehicle. To accommodate the tow vehicle, the travel trailer is generally equipped with a tongue jack located at the tongue or coupler end of the trailer. Generally, the tongue jack is employed for raising or lowering a coupler device which is located at the forward end of the trailer. Thus, the tongue jack permits positioning the coupler device onto and off of a ball hitch which is mounted on the rear end of the tow vehicle.

In the past, this task has been accomplished by aligning the ball hitch device of the tow vehicle directly under the coupler device of the travel trailer. The current practice has been to adjust the ball hitch alignment of the tow vehicle which usually requires numerous backing maneuvers of the tow vehicle and often requires an extra person to assist in signaling the driver. The tow vehicle was positioned so that the ball hitch device was sufficiently close to the trailer coupler so that when the travel trailer was lowered by releasing the tongue jack, the coupler device captured the ball hitch. The main problem is that the coupler device absolutely must be closely aligned with the ball hitch device in order to successfully connect the travel trailer to the tow vehicle.

Several methods have been employed in the past in an attempt to solve this alignment problem. One such method included a trailer hitch system having longitudinal hitch ball movement wherein the trailer tow point could be laterally adjusted. Another design included a trailer hitch having a laterally adjustable coupling member which included a follower comprising a sleeve threaded on a screw which was operated by a crank for laterally adjusting the coupling member. In motorized tractor vehicles, a drawbar coupling employed a block which was laterally moved along a guide by a worm screw member, and in a more current method, a tractor truck having a pivoting frame extending from the rear included a hitching ball mounted thereon and laterally shiftable by a hydraulic actuator. A different approach incorporated a hand-cranked, non-traveling screw for repositioning the tongue extending from the towed vehicle to extreme angles.

Many of the methods and devices which have been known each employ a threaded screw member and a ball hitch with a means for adjusting the lateral position of the ball hitch. Most of these systems employ apparatus which are connected directly to the tow vehicle for adjusting the position of the ball hitch and not to the towed travel trailer. Hence, the necessity of having to closely align the coupler device with the ball hitch device in order to successfully connect the travel trailer to the tow vehicle still exists.

In accordance with the present invention, the threaded drive screw 102 and a cylindrically shaped block trunnion 114 cooperate to carry the load-bearing sled 106 and tongue jack 108 along the length of the drive screw 102 for substantially simplifying the alignment process between the trailer coupler 110 and the tow vehicle ball hitch, and to significantly improve the coupling efficiency by permitting alignment of the trailer coupler 110 to the stationary vehicle ball hitch in a horizontal or angular pattern. Further, the apparatus widely distributes the mechanical load applied by the tongue jack to avoid binding, is rugged but simply constructed, can be operated by a ratchet, provides for water drainage for use in inclement weather, and is treated to inhibit rust and corrosion.

The bedplate 104 is attached along its side to a pair of side plates 116 for forming a channel and at its ends to two separate end plates 118. The end plates 118 are rectangular in shape and are welded to the inside of both the bedplate 104 and the side plates 116. The end plates sit at the ends of the bedplate and are welded along each seam except at a pair of corners 124 formed at the intersection of the end plates 118 and the bedplate 104. The corners 124 are radiused or partially curved and are not welded to permit drainage of rainwater during use of the apparatus in inclement weather. Upon assembly, the forms the base of bedplate forms the base of into a box-like structure which is employed for housing, supporting, and aligning the threaded drive screw 102.

Figure 2:
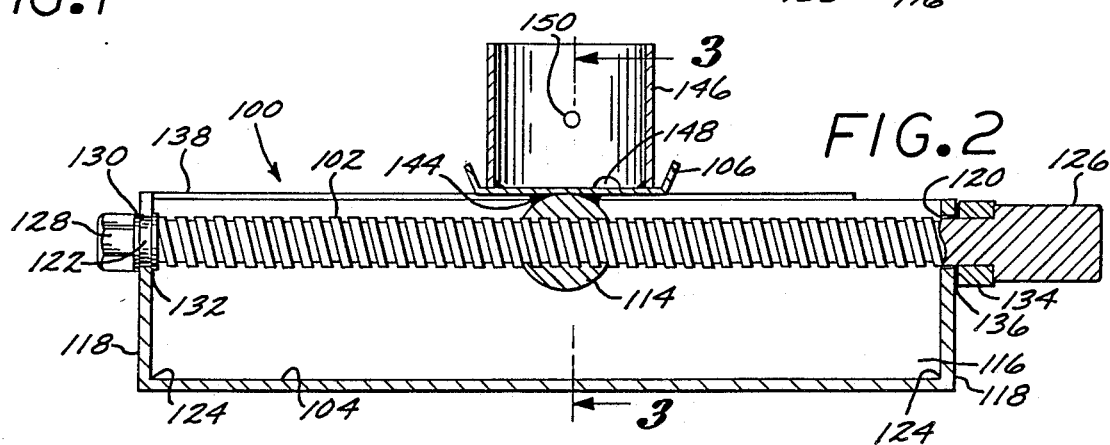
FIG. 2 is a cross-sectional view of the tongue alignment apparatus taken along the line 2-2 of FIG. 1.

Each of the end plates 118 includes a penetration 120, 122 for permitting the passage of the drive screw therethrough as is shown in FIG. 2. The threaded portion of the drive screw is terminated just prior to passage through the end plate penetrations 120, 122 so that the penetrations act as a journaling or bearing surface for the drive screw. Located at the top of each of the side plates 116 at a position furthest from the bedplate 104 there is formed a flange or rail 138 which is employed for supporting the load-bearing sled 106 as will be described hereinafter.

At one end of the drive screw is a drive screw hex head nut 126 which is either welded to or formed directly on the end of the threaded drive screw 102. The hex head 126 should be a solid nut which is designed to be rotated by any of a plurality of hand tools such as a ratchet, drive wrench, crescent wrench or other mechanical device including a coupled linkage to an electro-mechanical driving apparatus such as a motor. On the opposite end of the drive screw 102 is a securing nut 128 which is designed to secure the end of the drive screw in the end plate 118. The securing nut may also be a hex-formed nut but is not meant to be used for manually rotating the drive screw. However, the securing nut can be any type of mechanical locking nut device including a nylon lock nut having a nylon interior or insert. Notwithstanding the type of securing nut employed, the threads on the back of the securing nut 128 are staked or distorted so that the nut is permanently locked onto the end of the drive screw.

Between the securing nut 128 and the end plate 118 is a thrust washer 130 which is designed to eliminate or reduce the galling of the securing nut 128 against the end plate 118. Further, between the end plate and the termination of the threads on the drive screw 102, a washer 132 is placed over the drive screw to further eliminate galling against the inside of the end plate 118 and to provide further journaling support for the terminal end of the drive screw.

Located immediately between the hex head 126 and the end plate 118 is a collar 134 formed around the drive screw 102 prior to the formation of the threads thereon. The hex head 126 has a diameter greater than that of the threaded drive screw 102 with the reduction of the diameter of the drive screw between the hex head and the end plate 118 forming a gap for receiving the collar 134 as is shown in FIG. 2. The collar has a diameter greater than both the hex head and the drive screw and is mounted adjacent to the end plate 118 with a thrust washer 136 placed therebetween. The thrust washer 136 reduces the galling effect between the collar 134 and the end plate 118. The collar 134 is located on the external side of the end plate 118 immediately adjacent to the hex head 126. Therefore, the collar is located immediately behind the hex head and acts as a backstop for the hex head 126 by preventing a wrench or ratchet from slipping off of the back of the hex head. Further, since it would be difficult to rotate the hex head 126 against the flat surface of the end plate 118, the collar acts as a spacer to permit separating the wrench or ratchet from the end plate and further acts as a bearing surface to permit the wrench or ratchet to be rotated against. The end plates 118 have a height dimension which provides sufficient clearance to permit rotating the hex head with a standard handtool such as a ratchet or wrench so as not to cause injury to the hand of the user.

Figure 3:
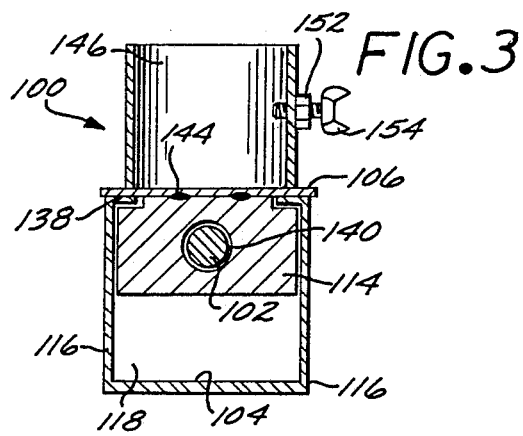
FIG. 3 is a cross-sectional view of the tongue alignment apparatus taken along the line 3-3 of FIG. 2.

Within the confines of the apparatus 100, the threaded drive screw 102 passes through a threaded penetration 140 formed through the block trunnion 114 as is shown in FIGS. 2 and 3. The drive screw is threaded through the penetration 140 so that when the hex head 126 is rotated, the block trunnion 114 is driven along the length of the drive screw 102. The trunnion 114 is fastened to the underside of the load-bearing sled 106, for example, as by riveting or welding at point 144. Thus when the trunnion is driven up and down the length of the drive screw, the sled 106 is carried therewith riding along the top of the flanges 138 located at the top of the side plates 116.

Additionally, a cup-like container or receiver ring 146 is mounted to the top of the load-bearing sled 106 and travels with the sled and the trunnion 114 along the length of the drive screw 102 when the hex head 126 is rotated. The receiver ring may be attached to the sled as by, for example, welding and may include at least one or a plurality of drain holes 148 for providing an escape for rainwater and debris when the apparatus 100 is employed in inclement weather. The drain holes 148 may be preformed along the interface between the receiver ring 146 and the sled 106 as is illustrated in FIG. 2, or in the alternative may be metallic punchouts to be later removed during use.

Figure 4:
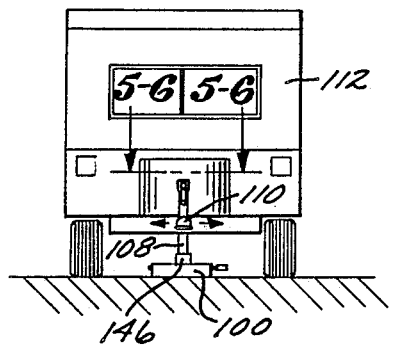
FIG. 4 is an end view of a non-motorized travel trailer showing a tongue jack mounted in a receiver ring of the tongue alignment apparatus of FIG. 1.

Under normal conditions, the vertical leg of the trailer tongue jack 108 shown in FIG. 4 is mounted into a base pad (not shown) which is usually supported by the pavement or the ground for securing the travel trailer. In the alternative, the leg of the tongue jack may include a caster wheel (not shown) mounted on the ground which assists in manually maneuvering the travel trailer into desired positions. During use of the trailer tongue alignment apparatus 100, either the base pad or the caster wheel is removed and the travel trailer jack 108 is positioned into the receiver ring 146 located on top of the load-bearing sled 106 as is shown in FIG. 4. The receiver ring 146 is normally fabricated having a standard height dimension as shown in FIG. 2.

However, an optional feature provides for a receiver ring 146 having a greater height dimension for capturing yet a greater portion of the trailer tongue jack 108. Under these conditions, the receiver ring may include a penetration 150 with a threaded nut 152 or the like welded to the outside of the receiver ring as shown in FIGS. 1 and 3. This feature permits threading an optional wing bolt 154 through the threaded nut 152 for securing the tongue jack 108 to the apparatus 100. In either case, it is the sled 106 that carries the mechanical load applied by the trailer tongue jack 108 with the mechanical load being distributed over the flanges 138. It is the flanges 138 that provide the primary support to the sled 106 that carries the load applied to the sled. Secondary means of support for the sled 106 is provided by the block trunnion 114 which is employed for translating the rotary motion of the threaded screw 102 to translational motion of the sled along the drive screw. Thus by rotating the hex head 126, the threaded drive screw 102 is caused to drive the sled and trunnion back and forth along the elongated channel of the frame. It should be noted that the trunnion 114 is described herein as being cylindrical in shape, however, various shaped trunnion blocks including the use of trunnion pins are entirely possible in an alternate design.

The general methods of activating the trailer tongue alignment apparatus 100 may also include an offset handle wrench having an L-shaped portion for fitting into a modified form of the hex head nut 126 designed for this very application. The modified hex head would include a hole formed in one of the six faces of the hex head for receiving the L-shaped portion of the offset handle wrench. However, the preferred form of the hex head 126 is solid and is activated by a standard adjustable wrench or ratchet.

Finally, the entire apparatus 100 is zinc plated for inhibiting rust and corrosion as it is foreseen the apparatus will be utilized in inclement weather. Zinc plating is preferred to standard exterior paint since it is anticipated that the apparatus will be utilized on or about the pavement of parking lots and the like. Further, zinc plating is more economical than chrome or other metallic plating surfaces and thus permits more economical production resulting in an overall reduced cost to the consuming public.

In use, when a tow vehicle having a ball hitch (not shown) attached to the rear bumper is maneuvered backward towards a travel trailer 112, the ball hitch need only be roughly aligned with the trailer coupler 110 as is shown in FIg. 4. The base pad or caster wheel may be removed and the trailer tongue jack 108 may be physically positioned into the receiver ring 146 as shown in FIGS. 1-3. After the optional wing bolt 154 (if fitted) is secured against the tongue jack 108, the hex head 1236 is manually rotated. By turning the hex head, the threaded drive screw 102 is rotated causing the block trunnion 114 to travel along the length of the drive screw, driving the load-bearing sled 106 along the flanges 138 mounted atop the bedplate 104. Movement of the sled 106 carries the receiver ring 146 therewith.

Figure 5:
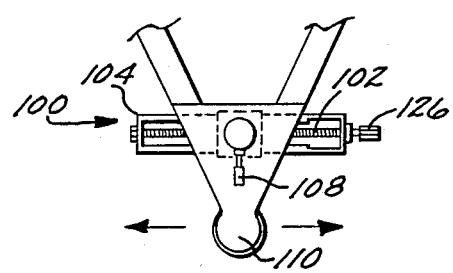
FIG. 5 is a first cross-sectional view of a travel trailer tongue mounted over the tongue alignment apparatus taken along the line 5-5 of FIG. 4 and positioned for horizontal alignment of the trailer tongue.

Since the tongue jack 108 is securely mounted within the receiver 146, the tongue jack and the trailer coupler 110 are caused to shift laterally along the length of the bedplate 104 as is illustrated in FIG. 5. When the apparatus 100 is positioned parallel with the bumper cf the tow vehicle, the aligning force or torque applied by the apparatus to the trailer tongue jack 108 forces the trailer to move in a laterally left or right position with the limit of movement being directly dependent upon the stroke of the drive screw 102 along the channel within the frame.

Figure 6:
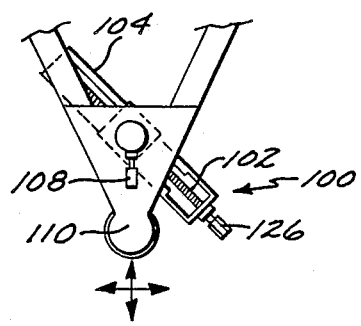
FIG. 6 is a second cross-sectional view of a travel trailer tongue mounted over the tongue alignment apparatus taken along the line 6-6 of FIG. 4 and positioned for angular alignment of the trailer tongue.

Likewise, the apparatus 100 may be positioned in an angular pattern as is shown in FIG. 6. When the apparatus is positioned at an angle with respect to the bumper of the tow vehicle, rotation of the hex head 126 results in the tongue jack 108 and trailer coupler 110 being pulled forward in an angular direction consistent with the position of the apparatus if the trailer road wheels are not blocked and if the trailer is positioned on level ground. Thus, the entire trailer tongue and coupler 110 is shifted laterally or angularly by a wrench or similar hand tool employed for turning the hex head 126 located at the end of the threaded drive screw 102. Fine adjustments to the trailer tongue and coupler can therefore be made for positioning the coupler over the ball hitch more easily than if the tow vehicle was maneuvered.

From the foregoing, it will be appreciated that the trailer tongue alignment apparatus 100 of the instant invention permits simplifying the alignment process between the trailer coupler 110 and the tow vehicle ball hitch, and that the coupling efficiency is significantly improved by permitting alignment between the coupler and the ball hitch in either a horizontal or angular pattern. Further, the simple rugged construction permits the tongue jack mechanical load to be widely distributed to avoid binding. Since the apparatus is primarily designed for use outdoors, drainage holes allow for the escape of rainwater and debris while a rust and corrosion inhibitor extend the service life of the apparatus.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A trailer tongue alignment apparatus for aligning a trailer tongue with a tow vehicle ball hitch comprising, in combination:
    a housing;
    a threaded screw mounted within said housing for rotating about a fixed axis;
    a receiver ring for supporting a tongue jack of a trailer, said receiver ring affixed to a load-bearing sled mounted on said housing;
    a block trunnion affixed to said load-bearing sled for movably connecting said sled to said threaded screw; and
    a nut in communication with said threaded screw for rotating said screw about said fixed axis, said rotated screw incrementally driving said sled along said fixed axis for adjusting the position of said tongue jack and for aligning said trailer tongue with said tow vehicle ball hitch.

2. The apparatus of claim 1 wherein said receiver ring further includes at least one drain hole for draining water and debris.

3. The apparatus of claim 1 wherein said receiver ring further includes a wing bolt for securing said tongue jack to said receiver ring.

4. The apparatus of claim 1 further including a collar located between said housing and said nut for providing a bearing surface.

5. The apparatus of claim 4 further including a thrust washer located between said housing and said collar for eliminating galling and excessive wear of said housing and collar.

6. The apparatus of claim 1 wherein said load-bearing sled is mounted upon and translates along a pair of flanges mounted on said housing.

7. A trailer tongue alignment apparatus for aligning a trailer tongue jack with a towing vehicle hitch and comprising:
    an elongated housing;
    a threaded screw mounted within said housing for rotating about a fixed axis;
    a trunnion movably mounted on said housing and having a threaded hole therethrough for receiving said threaded screw to drive said trunnion along said screw.
    receiver means coupled with said trunnion and adapted for receipt of such trailer tongue jack;
    support means interposed between said housing and receiver means to support such travel trailer tongue jack from said housing when attached to said trunnion, whereby, when said jack is received in said receiver means and said screw rotated incrementally one way or the other, said receiver will be advanced one way or the other along said threaded screw for aligning said jack with said tow vehicle hitch.

8. A trailer tongue alignment apparatus as in claim 7, further comprising:

means for rotation of said threaded screw around said fixed axis.

9. A trailer tongue alignment apparatus as in claim 8 wherein:

said means for rotation is a hex nut fixed at one end of said threaded screw.

* * * * *